United States Patent [19]
Payne

[11] 3,870,379
[45] Mar. 11, 1975

[54] ENDLESS TRACTION ASSEMBLY

[75] Inventor: Guy D. Payne, Menomonee Falls, Wis.

[73] Assignee: Outboard Marine Corporation, Waukegan, Ill.

[22] Filed: Dec. 11, 1972

[21] Appl. No.: 313,809

[52] U.S. Cl. .............. 305/35 EB, 305/38, 180/5 R
[51] Int. Cl. ..................... B62d 65/24, B62m 27/02
[58] Field of Search ............ 308/35 EB, 38; 180/5 R

[56] References Cited
UNITED STATES PATENTS

| | | | |
|---|---|---|---|
| 2,025,999 | 12/1935 | Myers | 305/38 |
| 2,107,490 | 2/1938 | Mayne | 305/38 |
| 3,362,492 | 1/1968 | Hansen | 305/35 EB X |
| 3,510,174 | 5/1970 | Lamb | 305/35 EB X |
| 3,572,851 | 3/1971 | Schuler | 305/35 EB |
| 3,680,926 | 8/1972 | Trapp | 305/35 EB |
| 3,690,394 | 9/1972 | Skime | 180/5 R |

*Primary Examiner*—Philip Goodman
*Attorney, Agent, or Firm*—Michael, Best & Friedrich

[57] ABSTRACT

The endless traction assembly disclosed herein includes a sprocket about which an endless track is trained. The endless track has a number of flexible belts interconnected for movement in a parallel spaced relationship by a plurality of transverse traction bars secured at uniformly spaced intervals to the outer surface of the belts. Each traction bar has an offset drive section which extends into the space between the belts and is sequentially engaged by the sprocket gear teeth. The drive sections are arranged so that the line of engagement between the sprocket engaging surfaces thereof and the sprocket teeth always substantially coincides with the neutral axis of the belts.

10 Claims, 3 Drawing Figures

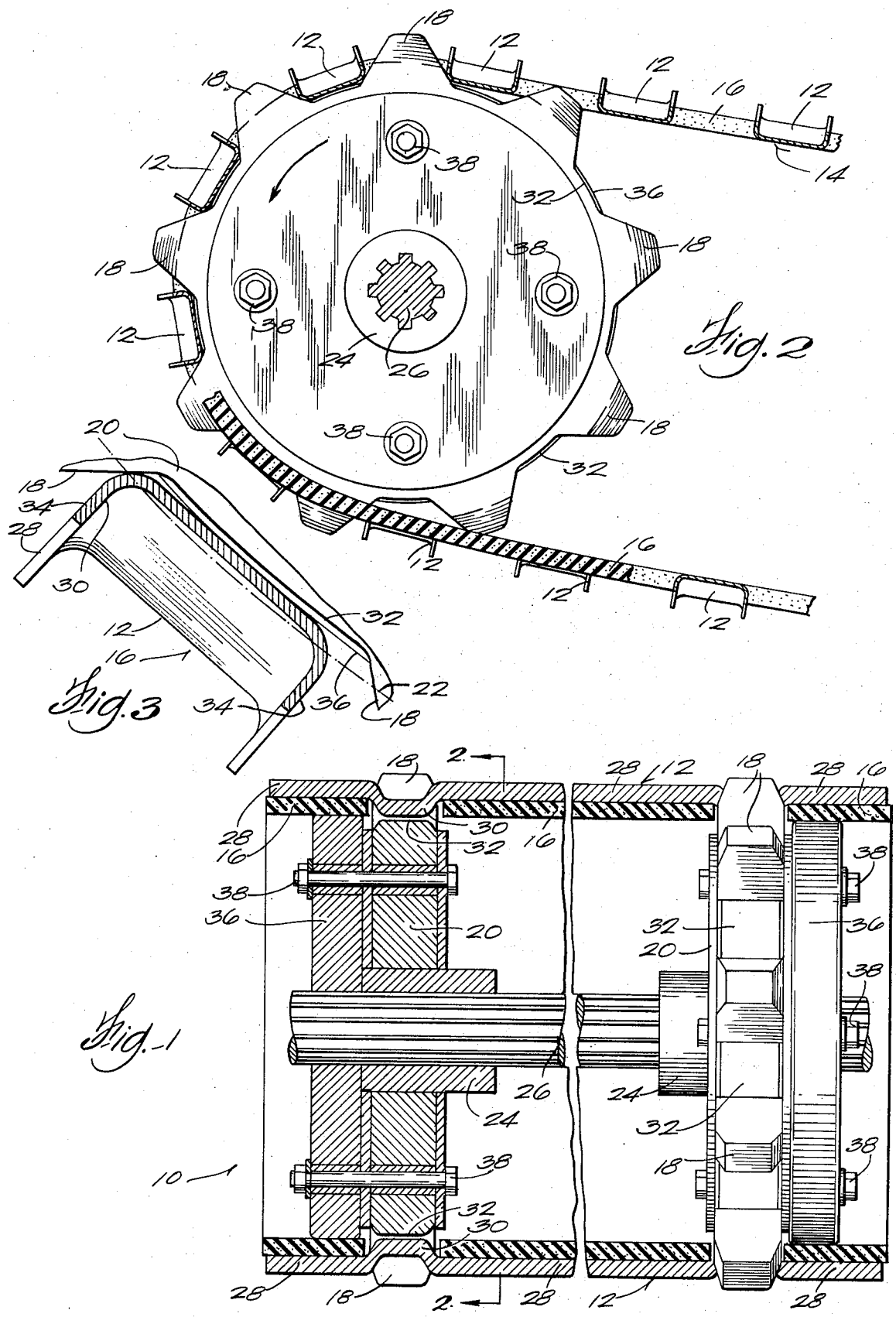

ENDLESS TRACTION ASSEMBLY

BACKGROUND OF THE INVENTION

This invention relates generally to an endless traction assembly, more particularly, to an arrangement for such an assembly whereby wear and power losses caused by sprocket teeth rubbing are minimized.

Endless traction assemblies, particularly the type used to provide traction for vehicles such as snowmobiles, commonly include an endless track having a number of flexible belts interconnected by spaced, transverse traction bars or cleats mounted on the outer surface of the belts. The track is trained over one or more pairs of axially spaced drive and idler sprockets and is driven by teeth on the drive sprocket which sequentially engage the traction bars. The idler sprocket generally includes identically arranged teeth.

The belts are typically made from a fiber-reinforced elastomeric material and the traction bars are arranged so that the line of engagement with the sprocket teeth does not coincide with the neutral axes of the belts. Also, the traction bars are supported on the root diameter of the sprocket teeth. As the track travels around the drive sprocket and the traction bars are engaged by the teeth, the belts are subjected to flexure stresses which cause a deformation of the belts and a resultant change in the distance between the traction bars. Consequently, as the traction bars disengage from the drive sprocket teeth during normal operation and the belts return to their normal length, the traction bars tend to grab onto the drive sprocket teeth, i.e., tend to stay on the sprocket teeth. The resultant rubbing and scraping of the traction bar against the sprocket teeth causes wear to the sprocket teeth and traction bars and a loss of driving power equivalent to that required to pull the traction bars off the sprocket teeth. A somewhat similar rubbing action occurs as the traction bars engage the teeth of the idler sprocket and engage the teeth of the drive sprocket during periods of braking or deceleration when the track is tending to drive the sprockets. In this case, the deformation of the belts upon engagement of the traction bars with the sprocket teeth causes the traction bars to tend to ride up on the sprocket teeth with a resultant rubbing action.

SUMMARY OF THE INVENTION

The endless traction assembly according to this invention includes a sprocket having uniformly spaced teeth on the outer periphery and an endless track trained about the sprocket. The endless track includes a number of flexible belts interconnected for movement in a parallel spaced relationship by a plurality of transverse traction bars or cleats secured at uniformly spaced intervals to the outside of the belts. Each traction bar includes an offset drive section which extends into the space between the belts and is sequentially engaged by the drive sprocket teeth. The drive sections are arranged so that the line of engagement between the sprocket engaging surfaces thereof and the teeth of the sprocket substantially coincides with the neutral axis of the belts. With this arrangement, the traction bars engage or are engaged by the sprocket teeth at a point or line corresponding to that where there is no change in belt length during belt travel around the sprockets. Hence, the tendency of the traction bars to grab onto the drive sprocket teeth during disengagement therefrom and to ride up on the sprocket teeth when the belts are driving the sprocket is substantially eliminated and wear and power losses associated with these problems are reduced.

Also in accordance with this invention, a guide wheel is concentrically positioned adjacent to one side of the sprocket. The guide wheel has an outside diameter slightly greater than the diameter of the roots of the sprocket teeth and one of the belts rides on the outside surface thereof to provide a clearance between the sprocket teeth roots and the underside of the drive sections.

The track by riding on the guide wheel as it travels around the sprocket, conforms to a true radius rather than a series of chords between the sprocket teeth as occurs with prior art arrangements where the traction bars are supported on the root diameter of the sprocket teeth. This increases the accuracy of coincidence between the pitch circle of the sprocket teeth and the neutral axis of the track. This clearance provided by the guide wheel also provides an escape passage for snow, dirt, mud, etc. The outer edges of the sprocket teeth and roots are beveled and an annular recess is provided between each guide wheel and the respective sprocket to provide escape passages for snow, dirt, mud, etc. which might otherwise tend to accumulate between the track and the guide wheel.

A primary object of this invention is to provide an arrangement for an endless traction assembly whereby rubbing between the traction bars of the endless track and the sprocket teeth is minimized.

Other objects and advantages of this invention will become apparent to those skilled in the art from the following detailed description, drawing, and appended claims.

BRIEF DESCRIPTION OF THE DRAWING

FIG. 1 is a fragmentary, partially sectioned view, through the front axle assembly, of the endless traction drive assembly of this invention.

FIG. 2 is a fragmentary sectional view, partially broken away, taken along the plane designated 2—2 in FIG. 1.

FIG. 3 is an enlarged, partially sectioned, fragmentary view showing the relationship between the sprocket teeth and a traction bar drive section.

DESCRIPTION OF THE PREFERRED EMBODIMENT

Before explaining the invention in detail, it is to be understood that the invention is not limited in its application to the details of construction and arrangement of components set forth in the following general description or illustrated in the drawings. The invention is capable of other embodiments and of being practiced or carried out in various ways. Also, it is to be understood that the phraseology or terminology employed herein is for the purpose of description and should not be regarded as limiting.

An endless traction assembly 10 according to this invention is arranged so that the line of engagement between traction bars 12 on an endless track 14 (which includes fiber-reinforced belts 16) and the teeth 18 on drive sprocket 20 always substantially coincides with the neutral axis 22 of the belts 16. In FIGS. 1 and 2, a portion of the endless track 14 is shown mounted on a pair of drive sprockets 20 which are connected to a power source (not shown), such as an engine or the transmission of a vehicle. Although only drive sprockets 20 are shown in FIGS. 1 and 2, it should be understood that the endless track 14 is also trained over a corresponding pair of idler sprockets which are longitudinally spaced from and parallel to the drive sprockets and hold the track in fairly tight engagement with the drive sprockets. The endless track 14 is driven by teeth 18 on the drive sprocket 20 which sequentially engage the traction bars 12.

As used herein, the term "neutral axis" means the plane in the belt in which the stress equals zero when the belts are subjected to flexure stresses while the track is travelling about the drive and idler sprockets. In other words, it is the plane of the belts in which the belt is not subjected to either compressive stress or tensile stress, and therefore experiences no deformation in the direction of the length of the track, during movement of the track around the sprockets.

More specifically, the drive sprockets 20 include a central hub 24 receiving a drive shaft 26 which is connected to a suitable power source (not shown). The sprocket teeth 18 are uniformly spaced on the outer periphery of the drive sprocket 20. The idler sprockets are arranged in the same manner as the drive sprockets except, of course, they do not have to be connected to a power source. The endless track 14 shown in FIGS. 1 and 2 includes three belts 16 which are interconnected for movement in parallel spaced relation about the drive and idler sprockets by transverse traction bars 12. The belts 16 are arranged so that their neutral axes substantially coincide. The traction bars 12, which have a generally U-shaped cross section, are longitudinally spaced along the belts 16, at a distance generally corresponding to the circumferential distance between the roots of adjacent sprocket teeth 18 on the drive and idler sprockets.

The embodiment shown in FIGS. 1 and 2 the endless traction assembly employs two pairs of drive and idler sprockets and three flexible belts. It is within the scope of this invention to arrange the endless traction assembly with a single pair of drive and idler sprockets and two flexible belts or with more than two pair of drive and idler sprockets with a corresponding number of flexible belts.

As shown in FIG. 1, each of the traction bars 12 includes belt connecting sections 28 and offset drive sections 30. The belt connecting sections 28 are secured to respective belts by suitable fastening means (not shown), such as rivets. The drive sections 30 are offset into the space between the belts 16 and extend towards the roots 32 of the sprocket teeth 18 on the drive and idler sprockets. Each drive section 30 includes sprocket teeth engaging surfaces 34, one of which is sequentially engaged by the driving surface of the sprocket teeth 18 as the track 14 travels around the sprockets.

In order to provide a small clearance between the underside of the drive sections 30 and the roots 32 of the sprocket teeth 18 and thereby insure that the track 14 conforms to a true radius as it travels around the drive and idler sprockets and the engagement of the sprocket teeth and the drive sections accurately coincides with the neutral axis of the belts, each of the drive and idler sprockets is provided on one side thereof with a guide wheel 36. The guide wheel 36 is concentrically attached on the sprocket, such as by bolts 38, and a corresponding belt 16 rides on the outer surface of the guide wheel as the track 14 travels around the sprockets. As shown in FIGS. 1 and 2, the outside diameter of the guide wheel 36 is slightly greater than the diameter of the roots 32 of the sprocket teeth 18. This clearance also provides an escape passage for any snow, dirt, mud etc. which otherwise might accumulate between the drive sections and the sprocket teeth roots.

The drive sections 30 are positioned with a respect to the belts 16 and the contour of the sprocket teeth engaging surfaces 34 is arranged so that the line of engagement on the sprocket engaging surfaces 34 and on the sprocket teeth 18 of the drive and idler sprocket always substantially coincides with the neutral axis 22 of the belts. As shown in FIGS. 2 and 3 the sprocket engaging surfaces 34 are preferably rounded.

The location of the neutral axis for any particular belt depends primarily upon the type of material from which the belt is fabricated. Well known conventional techniques can be used to make this determination. Once the location of the belt neutral axis has been established, the traction bar drive sections and the sprocket teeth are arranged so that the line of engagement between the two substantially coincides with the neutral axis. With this arrangement, the traction bars either are engaged by or engage the sprocket teeth (depending upon whether the sprocket is driving or is being driven by the track) at a point or line where there is substantially no change in the length of the belt from flexure stresses as the track curves to conform to the sprockets. Therefore, the traction bars can engage with and disengage from the sprocket teeth with minimum interference and wear. Power loss associated with such interference is accordingly substantially reduced.

As shown in FIG. 1, the outer edges of the sprocket teeth roots 32 and the outer edges of the portions of the sprocket teeth 18 engaging the drive sections 30 are beveled to provide escape passages for any snow, dirt, mud, etc. which otherwise might accumulate between the sprocket teeth and the drive sections. The guide wheels 36 are arranged so that an annular recess is provided between each guide wheel and its respective sprocket for the same purpose.

I claim:

1. An endless traction assembly comprising a sprocket having a predetermined root diameter and uniformly spaced teeth extending from said root diameter, means for rotatably driving said sprocket, an endless track trained about said sprocket including two flexible belts positioned in spaced, parallel relation to each other, and a plurality of uniformly spaced and transversely extending traction bars mounted on the outer surface of said belts and each having at least one drive section with sprocket teeth engaging surfaces extending into the space between said belts for sequential engagement by said sprocket teeth, and being arranged with respect to said belts so that the line of engagement between said sprocket teeth and said sprocket engaging surfaces substantially coincides with the neutral axis of said track, a guide wheel having an outer diameter slightly greater than said root diameter, and means for fixing said guide wheel to one side of said sprocket for common rotation therewith and in concentric relation thereto said guide wheel and with said outer diameter engaging one of said belts so as to locate said track for driving engagement between said traction bars and said sprocket along the track neutral axis and for maintenance of a small clearance between said drive sections and said root diameter.

2. An assembly according to claim 1 wherein said sprocket engaging surfaces of said drive sections are rounded.

3. An assembly according to claim 2 wherein each of said traction bars is generally U-shaped.

4. An assembly according to claim 1 wherein said sprocket teeth have portions which engage said drive sections and have beveled outer edges.

5. An endless traction assembly comprising a sprocket having uniformly spaced teeth on the outer periphery thereof, said sprocket teeth having roots with beveled outer edges, means for rotatably driving said sprocket; and an endless track trained about said sprocket including two flexible belts positioned in spaced, parallel relation to each other, and a plurality of uniformly spaced and transversely extending traction bars mounted on the outer surface of said belts and each having at least one drive section with sprocket teeth engaging surfaces extending into the space between said belts for sequential engagement by said sprocket teeth, and being arranged with respect to said belts so that the line of engagement between said sprocket teeth and said sprocket engaging surfaces substantially coincides with the neutral axis of said belts.

6. An assembly according to claim 1 wherein an annular recess is provided between said guide wheel and said sprocket.

7. An endless traction assembly comprising a pair of coaxially spaced sprockets having a plurality of uniformly spaced teeth on the outer periphery thereof, said sprocket teeth extending from a predetermined root diameter; means for rotatably driving said drive sprockets; an endless track trained about said sprockets and including three flexible belts positioned in spaced parallel relation to each other and a plurality of uniformly spaced transversely extending traction bars mounted on the outer surface of said belts with each of said traction bars having a pair of transversely spaced drive sections which extend into respective spaces between said belts and are sequentially engaged by the teeth of said sprockets, said drive sections having sprocket engaging surfaces and being arranged with respect to said belts such that the line of engagement between said sprocket teeth and said sprocket engaging surfaces substantially coincides with the neutral axis of said track; respective guide wheels having respective outer diameters slightly greater than said root diameter, and means for fixing said guide wheels concentrically with and to one side of each of said sprockets and with said outer diameters engaging the outer two of said belts so as to locate said track for driving engagement between said traction bars and said sprockets along the track neutral axis and for maintenance of a small clearance between the underside of said drive sections and said root diameters.

8. An assembly according to claim 7 wherein the sprocket engaging surfaces of said drive section are rounded.

9. An assembly according to claim 7 wherein said sprocket teeth have portions which engage said drive sections and which have beveled outer edges.

10. An assembly according to claim 7 wherein said root diameter has beveled outer edges.

* * * * *